United States Patent [19]

Floyd et al.

[11] 4,197,398

[45] Apr. 8, 1980

[54] PROCESS FOR NEUTRALIZING AND DEASHING POLYPROPYLENE

[75] Inventors: Joseph C. Floyd; Henry G. Schutze; Frank J. Lundy, Jr., all of Baytown, Tex.

[73] Assignee: Exxon Research & Engineering Co., Florham Park, N.J.

[21] Appl. No.: 899,556

[22] Filed: Apr. 24, 1978

Related U.S. Application Data

[63] Continuation-in-part of Ser. No. 677,477, Apr. 15, 1976, abandoned, which is a continuation of Ser. No. 529,385, Dec. 4, 1974, abandoned.

[51] Int. Cl.$^2$ .............................................. C08F 6/02
[52] U.S. Cl. ................................. 528/488; 526/351; 528/489

[58] Field of Search ............................... 528/488, 489

[56] References Cited

U.S. PATENT DOCUMENTS

| 2,900,373 | 8/1959 | Martin .................................. 260/94.9 |
| 3,075,959 | 1/1963 | Wagener et al. ..................... 260/94.9 |
| 3,112,302 | 11/1963 | Kolling et al. ....................... 260/94.9 |
| 3,520,866 | 7/1970 | Bacskal et al. ....................... 260/94.9 |

*Primary Examiner*—Stanford M. Levin
*Attorney, Agent, or Firm*—D. A. Roth; M. B. Kurtzman

[57] ABSTRACT

Polypropylene is neutralized and deashed by contacting a slurry of the particulate polymer with an alcohol solution of from 1 to 5 milliequivalents of an alkali base, preferably Na or K, excess beyond that needed to neutralize said polymer.

12 Claims, 2 Drawing Figures

PROCESS FOR NEUTRALIZING AND DEASHING POLYPROPYLENE

This application is a continuation-in-part of Ser. No. 677,477, filed Apr. 15, 1976 and now abandoned, which in turn was a continuation of Ser. No. 529,385, filed Dec. 4, 1974 and now abandoned.

BACKGROUND OF THE INVENTION

This invention relates to a process for neutralizing acidic catalyst residues remaining in alpha-olefin polymers. More particularly, the present invention relates to an improvement in the deashing process of propylene polymers such as polypropylene.

The polymerization of alpha-olefins, such as propylene alone or with other copolymerizable alpha-olefins, is well known and described in numerous patents, such as U.S. Pat. Nos. 2,112,300, 3,113,115, 3,197,452, Belgian Pat. No. 538,782 and British Pat. No. 994,416.

The catalyst is normally prepared from a transition metal compound, preferably a halide, and a reducing component consisting normally of metallic aluminum or a metal alkyl compound. Representative of the transitional metal compounds used is a metal selected from Groups 4B, 5B, and 6B of the Periodic System.* Included in the preferred species are the titanium halides, for example, titanium tetrachloride, titanium trichloride, and titanium dichloride and mixtures thereof. Other metal compounds, such as zirconium tetrahalide and hafnium tetrachloride, vanadium chloride, chromium chloride, tungsten chloride, and the like, are especially useful. Still other transitional metal halides containing halogens selected from the group consisting of bromine iodine, chlorine, and in certain instances, fluorine, can also be used.

*Handbook of Chemistry and Physics, The Chemical Rubber Co., Cleveland, Ohio, 45th Edition, 1964, p. B-2

The reducing component of the catalyst composition may be any of a variety of reducing agents. Most common among the reducing agents are the organometallic compounds such as triethyl aluminum, aluminum diethyl chloride, aluminum ethyl dichloride, aluminum diethyl hydride, aluminum triisobutyl, aluminum triisopropyl, and related compounds. Many other reducing agents such as lithium aluminum hydride, zinc ethyl hydride, and the like are described in the literature as useful reducing agents and can also be used. These catalyst are all of the now well known "Ziegler" variety.

Certain Ziegler catalyst, or more particularly, certain modified Ziegler catalysts, have been found to be especially useful for polymerizing alpha-olefins. For example, a titanium trichloride catalyst modified with aluminum chloride having the formula, $3TiCl_3.AlCl_3$. Normally, this modified Ziegler catalyst is activated with a metal alkyl such as an aluminum alkyl, and preferably with an aluminum alkyl halide having the structural formula, $R_2AlX$ or $R_3Al_2X_3$, wherein R is selected from the group consisting of alkyl radicals containing 1 to 12 carbon atoms or phenyl or benzyl radicals, and X is a halogen atom selected from the group consisting of chlorine, bromine or iodine.

For purposes of this invention, the transitional metal halide and the reducing component are present in molar ratios about 1 to 1. However, molar ratios of the transitional metal halide and the reducing component can be present in mole ratios from as low as 0.1 to 1 to as high as 6 to 1. If $TiCl_3$ is the transitional metal halide and diethyl aluminum chloride is the reducing agent, an aluminum to titanium ratio of about 0.33 atom of aluminum per atom of titanium is preferably used.

In a typical polymerization, liquid alpha-olefin is contacted with a catalyst such as $TiCl_3.\frac{1}{3}AlCl_3$ plus diethyl aluminum chloride in about 1 to 2 weight ratio. Productivity typically ranges from about 500 to 3000 pounds of polymer per pound of $TiCl_3.\frac{1}{3}AlCl_3$ catalyst.

The catalyst is simply prepared by mixing the various components whereupon an active catalyst is formed. If desired, the activated catalyst can be aged or otherwise further treated prior to use. For example, alkali metal halides, such as sodium chloride, potassium iodide, lithium bromide, or sodium fluoride, can be used as additives for improving catalyst efficiency and for controlling the length of the polymer chain.

The preferred catalyst composition for the polymerization of propylene comprises a modified titanium trichloride having the structural formula, $3 TiCl_3. AlCl_3$, activated with diethyl aluminum chloride. Ratios of diethyl aluminum chloride and titanium trichloride of between 0.3:1 and 6:1 may be advantageously used. The presence of an alkali metal halide in an amount of between 0.5 to 10 mols of an alkali metal halide per mol of reduced titanium tetrahalide, and preferably a mol ratio of from 0.8 to 5 mols of an alkali metal halide, such as sodium chloride, per mol of reduced titanium tetrahalide can be used for improving catalyst activity.

A variety of monomers may be polymerized with the Ziegler type catalysts. Any unsaturated hydrocarbon corresponding to the general formula, $R-CH=CH_2$, wherein R is selected from the group consisting of an alkyl radical having from one to six carbon atoms, a phenyl radical, and an alkyl substituted phenyl radical can be used. Examples of specific unsaturated hydrocarbons which can be polymerized include alpha-olefins containing 3 to 8 carbon atoms, such as propylene, butene, isobutylene, pentene, isoamylene, hexene, isohexenes, heptene, isoheptenes, octene, isooctenes, and the like. Unsaturated hydrocarbons containing 3 to 5 carbon atoms are especially suitable. Diolefins, such as butadiene and isoprene, and alkyl substituted ethylenic compounds having 6 to 8 carbon atoms, such as sytrene, methylstyrene, and the like, may also be polymerized by these processes. Mixtures of any of the above monomers can also be used.

The monomers may be polymerized at moderate temperatures and pressures with the Ziegler type catalysts described above, generally at temperatures of 0° C. to 150° C., with temperatures on the order of 25° C. to 80° C. being particularly useful. A solvent may be employed for the polymerizations, however, the olefin monomer is frequently used for this purpose. The polymerizations are perferably conducted under conditions that exclude atmospheric impurities such as moisture, oxygen and the like.

The pressure ranges from about atmospheric pressure to about several atmospheres with pressures in excess of about 500 psi rarely being employed.

After the polymer has been produced, the catalyst is deactivated by contacting the polymeric reaction mixture with a material which reacts with and deactivates the catalyst. Such materials include, for example, low alcohols, acetone and water. Thereafter, the polymer may be separated from the diluent, washed with water and dried. The removal of residual amounts of catalyst is most important since even the small amounts remaining after water washing can be detrimental to the polymer. Residual ash can be detrimental, for example, during extrusion of the polymer, wherein filter screens may become plugged by the ash or if not filtered from the polymer the ash may cause inherent weaknesses in the product, particularly filaments. Residual ash also may adversely effect antioxidant stability in the polymer and cause poor color qualities. Furthermore, proper neutralization is not normally practical without deashing. An acid polymer is undesirable, for example because of excessive equipment corrosion and poor polymer color properties. As used herein the phrase "neutralize the polymer" is understood to refer to neutralizing the acid components present in admixture with the polymer such as the chloride.

It is an advantage of the present invention that a high degree neutralization of the acidic and potentially acidic catalyst components is obtained. It is a further advantage of the present process that the neutralizing is not detrimental to the deashing. It is a particular feature of the present invention that polymer having excellent deashed and neutral characteristics is produced. These and other features and advantages will become clear from the following discussion.

DRAWINGS

SUMMARY OF THE INVENTION

Figure 1:
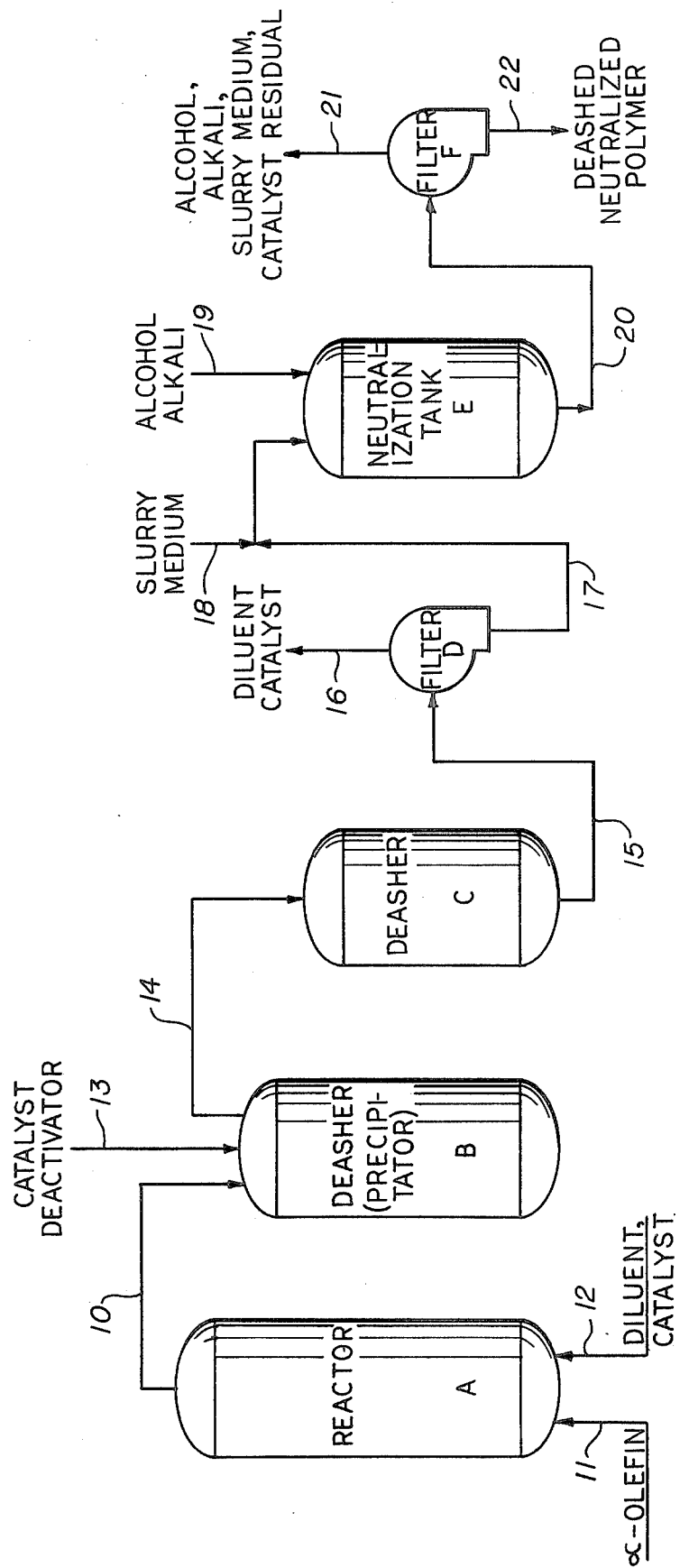
FIG. 1 is a schematic representation of continuous olefin polymerization and recovery system.

Briefly stated the present invention is a process for neutralizing an alpha-olefin polymer containing residual amounts of Ziegler type catalyst components comprising contacting said alpha-olefin polymer in particulate form in slurry with a composition comprising an alcohol having 1 to 6 carbon atoms and from about 1 to 5 milliequivalents per liter of slurry of an excess of a base beyond that required to neutralize said polymer in solution therein and, recovering a polymer having reduced residual amounts of Ziegler type catalyst components.

DETAILED DESCRIPTION OF THE INVENTION

The present invention is normally used in a two stage deashing process for polymers, such as polypropylene, prepared with Ziegler type catalyst. The term "deashing" is used to connote the removal of residual catalyst components, particularly the metals.

In the first deashing stage, the major portion of the catalyst remaining in the polymer is removed. This may be conveniently done by contacting a slurry of the polymer with a filter whereby the catalyst components pass through the filter in solution and are removed.

The filtered polymer particles, i.e., the filter "cake" is then reslurried and contacted with an alcohol solution of alkali metal. The slurry medium is usually an organic liquid in which the polymer is substantially inert, such as xylene, hexane, heptane or the like, i.e. any hydrocarbon having a boiling point above about 50° C.

The alcohol and the slurry medium may be the same, that is, at this second stage of deashing of the polymer the slurry medium may be an alcohol having 1 to 6 carbon atoms preferably aliphatic, as described below. Generally, however, the alcohol will comprise 20 to 50 volume percent of the slurry medium, the balance being the hydrocarbon as described above.

The base is preferably in the form of a solution of an alkali hydroxide or an alkali alcoholate in an aliphatic alcohol having 1-6, and more preferably 1 to 4 carbon atoms. Sodium and potassium are the preferred alkali metals. The alcoholates are preferably the Na and K salts of aliphatic alcohols having 1 to 6 carbons which may correspond to the alcohol solvent. Some suitable alkali materials for use in the present invention are NaOH, KOH, sodium methylate, potassium methylate, sodium isopropylate and the like. Suitable alcohol solvents are methanol, propanol, isopropanol, hexanol, cyclohexanol and the like. The presence of small amounts of water resulting from the reaction of NaOH solution used to make the neutralizing solution have not been found detrimental.

The polymer entering into the first stage deashing may contain 1000 to 3000 ppm of total catalyst components, and a substantial portion, i.e., 90 to 95% will usually be removed in the first stage. In the second stage of the deashing (i.e., neutralization) the total residual catalyst components may vary from about 70 to 425 ppm.

A preferred catalyst as described above is comprised of $TiCl_3$ and $AlCl_3$. The levels of residual catalyst components frequently found, after the first stage deashing, of polypropylene prepared with a 3 $TiCl_3.AlCl_3$ catalyst system range generally from 0 to 30 ppm Ti, 60 to 220 ppm Al, and 100 to 260 ppm Cl. The neutralization according to the process of the present invention substantially reduces these residual catalyst components. The level of residual Al and Cl are greatly reduced beyond the level obtainable by other methods. The level of Ti is slightly increased above that obtained by other methods of neutralization, however, the increase is only slight and still results in an acceptable level with the overall level of residual catalyst contamination being, nonetheless, lower than obtainable by other methods.

The initial amount of alkali metal is based on the chloride ion contaminate in the polymer. The excess amount of alkali metal added in accordance with this invention is 1 to 5 milliequivalents per liter of polypropylene slurry. There has been observed a reduction in chloride contamination with the addition of any base, however, at levels below about an excess of 1 milliequivalent per liter of polypropylene slurry (e.g., 50 mg NaOMe/l. polymer slurry) there is substantially no improvement in the reduction of Al and Ti contamination. Similarly at base excess greater than about 5 milliequivalents per liter of polypropylene slurry (e.g., 250 mg. NaOMe/l. polymer slurry) an observable increase in the residual catalyst contaminates occurs. The critical relationship of base excess was established by severall runs which were averaged and which are reported in FIG. 2.

In carrying out the neutralization according to the present invention the particulate polymeric material, such as polypropylene containing residual amounts of titanium, aluminum and chloride from the polymerization catalyst is fed to a wash drum into which the alkali metal compound are alcohol are fed, preferably in admixture. The polymer and neutralizing solution are intimately contacted by some means of agitation at temperatures in the range of 100° to 190° F. and from atmospheric to 10 atmospheres pressure. After a sufficient contact time, generally 5 minutes to 2 hours the slurry is filtered and the polymer having reduced Ti, Al and Cl content is recovered. The recovered polymer may be washed again, for example, with water, however, this is not essential to producing a good commercial grade of polymer having neutral characteristics and low ash content. The recovered polymer is dried and may be pelletized or converted in useful articles such as tubing, film, etc.

In FIG. 1 a particular environment embodying the present invention is depicted. In the figure a continuous process is shown, although the present invention is equally applicable to batch type operations. To describe the operation of the system a polymerization employing propylene will be described. A stream of high purity propylene is fed through line 11 into reactor A where it is agitated with a diluent, added through line 12, such as xylene with a Ziegler catalyst comprising 3 TiCl$_3$·AlCl$_3$ and diethyl aluminum chloride in the diluent. The reaction product is carried to precipitator B via line 10 where a catalyst deactivator such as methanol is introduced through line 13 and agitated with reaction product to deactivate the catalyst. The mixture from precipitator B passes the deasher C via line 14 where the contacting is continued and hence to filter D through line 15. In filter D the solvent and a substantial portion of the catalyst are removed through line 16 while the filter cake is reslurried with xylene and passed by line 17 into the neutralization tank E. The neutralizing solution of the present invention, i.e. the alcohol and alkali solution, methanol and Na methylate, enter tank E through line 19 and are agitated with the slurried polymer particles which then pass through line 20 to filter F. The xylene, methanol Na methylate and further catalyst residuals are removed as filtrate through line 21 and the deashed, neutralized polypropylene comes out as a moist powder, which may be water washed (not shown) and subsequent dried (not shown). Typical commercial sized runs according to the invention and at low and high alkali concentrations are given in TABLE I. The ash content throughout this application has been determined by the usual x-ray methods employed in the industry.

TABLE I

| Concentration* of Excess NaOMe | Catalyst Component | | | Total Catalyst Components |
|---|---|---|---|---|
| | Ti | Al | Cl | |
| 0.1 | 10 | 135 | 60 | 205 |
| 1.0 | 4 | 52 | 34 | 90 |
| 4.1 | 6 | 36 | 65 | 107 |

*in milliequivalents per liter of polymer slurry in excess over the amount required to neutralize the polymer

EXAMPLE 1

Figure 2:
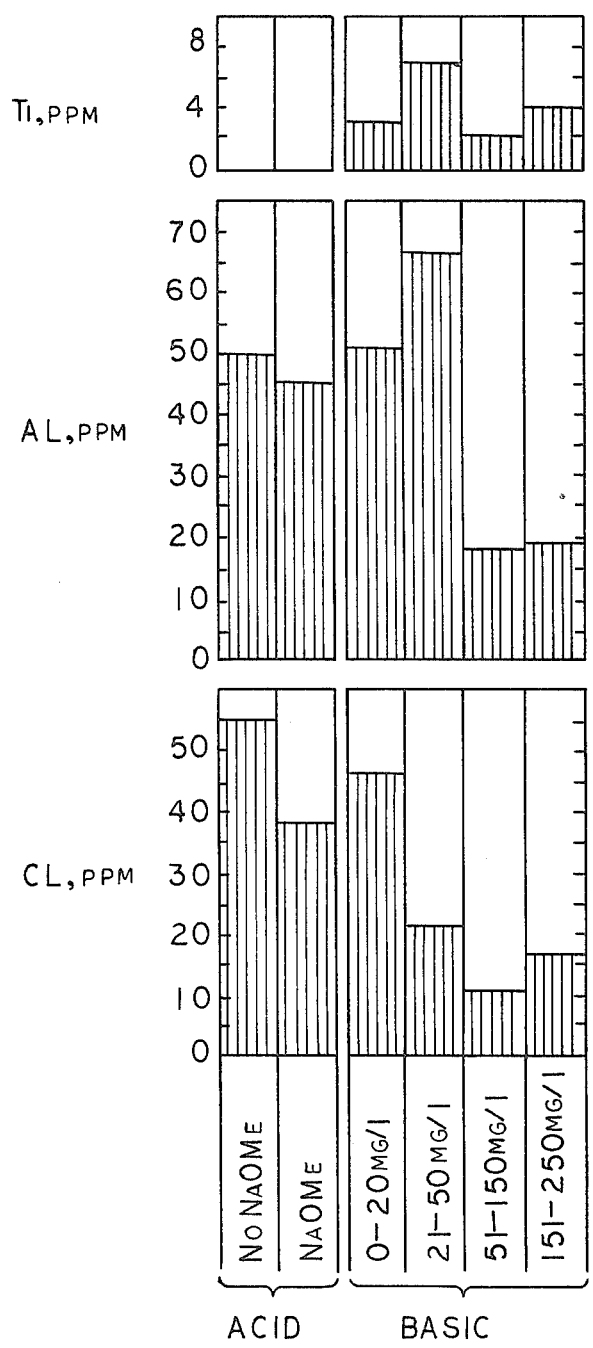
FIG. 2 is a bar graph showing the improvement in deashing achieved according to the present invention.

Two tests in plant equipment, similar to that described in FIG. 1, were carried out for two days, using sodium methylate in methanol. The slurry was made up of particulate polypropylene in xylene and the ratio of xylene:methanol was about 75:25, volume. In FIG. 2 the average values for titanium, aluminum and chloride from the two tests are plotted verse the level of acidity or basicity. The acid situations were divided into two groups, i.e., situations where no sodium methylate was being added to the second stage (FIG. 1, neutralizer E) and situations where sodium methylate was added at a rate insufficient to neutralize all of the chloride present. The basic situations were divided into four groups according to the value obtained for excess sodium by titration.

Substantial duplication of these plant equipment runs using 50% NaOH in methanol gave the same degree and type of results as NaOMe.

EXAMPLE 2

The purpose of this example is to illustrate the invention in batch laboratory experiments that simulate continuous operation in the plant. Additionally, this example compares sodium hydroxide with sodium methylate as the base used in the invention. Two samples of polypropylene powder that had been deashed and collected by filtration in a conventional polypropylene process were obtained.

Each sample was divided into several parts and each treated as described below. One part was dried and analyzed by x-ray fluorescence to determine the beginning concentrations of titanium, aluminum and chloride. A second part was treated with 30% methanol in xylene (2 g liquid per g of polymer) at 68° C. for about 30 minutes with stirring. The treated slurry was filtered and the filter cake washed to obtain complete displacement of the methanol-xylene solution. The filter cake was then dried and analyzed for titanium, aluminum and chloride by x-ray fluorescence. A third and fourth part each were treated in the same manner except that a NaOMe and NaOH were added to the respective parts with the methanol-xylene. The amount of NaOMe used was sufficient to neutralize all of the chloride present and leave an excess of about 1.7 milliequivalents per liter of slurry. The amount of NaOH used was sufficient to neutralize all of the chloride present and leave an excess of about 3.7 milliequivalents per liter of slurry.

The results shown in Table II demonstrate that the addition of the proper amount of base reduces aluminum and chloride ion concentrations in the final polymer product and that both sodium hydroxide and sodium methylate can be used in this invention.

TABLE II

| | X-Ray Analysis of Polymer | | |
|---|---|---|---|
| | Ti ppm | Al ppm | Cl ppm |
| Sample 1 | 50 | 118 | — |
| Sample 1, after treatment with Methanol-xylene | 2 | 53 | 51 |
| Sample 1, after treatment with sodium methylate in methanol-xylene | 3 | 25 | 14 |
| Sample 2 | 30 | 46 | — |
| Sample 2, after treatment with methanol-xylene | 1 | 25 | — |
| Sample 2, after treatment with sodium hydroxide in methanol-xylene | 2 | 15 | — |

What is claimed is:

1. A process for neutralizing and deashing washed particulate form polypropylene containing residual amounts of Ziegler type catalyst components comprising TiCl$_3$ and aluminum chloride, said particulate polypropylene containing from 100 to 260 ppm Cl and causing a reduction in the amount of said Cl containing Ziegler type catalyst components, comprising contacting a slurry of polypropylene with a composition comprising am alcohol solution of an alkali metal hydroxide or an alkali metal alcoholate so as to provide an amount of base sufficient to neutralize said polymer plus an excess of from about 1 to 5 meq. of said base per liter of slurry.

2. The process according to claim 1 wherein said base is a hydroxide or alcoholate of Na or K.

3. The process according to claim 2 wherein said alkali is Na.

4. The process according to claim 2 wherein said alkali is K.

5. The process according to claim 3 wherein sodium methylate is in solution in said alcohol.

6. The process according to claim 3 wherein sodium hydroxide is in solution in said alcohol.

7. The process according to claim 1 wherein said alcohol has 1 to 4 carbon atoms.

8. The process according to claim 2 wherein said alcohol is methanol.

9. The process according to claim 1 wherein said alpha-olefin polymer is slurried in a hydrocarbon having a boiling point above 50° C.

10. The process according to claim 9 wherein the volume ratio of said hydrocarbon to said alcohol is up to 80:20.

11. The process according to claim 1 wherein said contacting is carried out in the temperature range of 100° to 190° F. at pressures of from about 1 to 10 atmospheres.

12. In the process for preparing particulate polypropylene polymer comprising contacting propylene with a catalyst comprising $TiCl_3$ and $AlCl_3$ catalyst components at a temperature in the range of 0° to 150° C., deactivating said catalyst components, removing a substantial portion of said catalyst components by filtration of the polymer in slurry and recovering a polypropylene polymer product, wherein the improvement comprises:

recovering said filtered particulate polypropylene polymer having substantially lessened catalyst components therein because of said filtration, adding slurry medium and neutralizing said reslurried polypropylene polymer with a solution of an alkali metal hydroxide or alcoholate of Na or K in an aliphatic alcohol having 1 to 4 carbon atoms, said alkali metal hydroxide or alcoholate compound being present in an amount sufficient to neutralize said polymer plus an excess of from 1 to 5 milliequivalents of said base per liter of slurry.

* * * * *